US011170130B1

(12) United States Patent
Blumberg et al.

(10) Patent No.: US 11,170,130 B1
(45) Date of Patent: Nov. 9, 2021

(54) APPARATUS, SYSTEMS AND METHODS FOR STORING USER PROFILE DATA ON A DISTRIBUTED DATABASE FOR ANONYMOUS VERIFICATION

(71) Applicant: Aster Key, LLC, Voorhees, NJ (US)

(72) Inventors: Brad W. Blumberg, Voorhees, NJ (US); Eric M. Blumberg, Voorhees, NJ (US); Manojkumar Reddy Pulicherla, Lansdale, PA (US); Aaron Pardes, Montvale, NJ (US)

(73) Assignee: Aster Key, LLC, Voorhees, NJ (US)

( * ) Notice: Subject to any disclaimer, the term of this patent is extended or adjusted under 35 U.S.C. 154(b) by 0 days.

(21) Appl. No.: 17/225,320

(22) Filed: Apr. 8, 2021

(51) Int. Cl.
*G06F 21/62* (2013.01)
*G06F 16/23* (2019.01)
*H04L 9/30* (2006.01)
*H04L 9/32* (2006.01)
(Continued)

(52) U.S. Cl.
CPC ...... *G06F 21/6254* (2013.01); *G06F 16/2379* (2019.01); *G06F 21/602* (2013.01); *G06F 21/64* (2013.01); *H04L 9/30* (2013.01); *H04L 9/3239* (2013.01); *H04L 9/3242* (2013.01); *H04L 2209/38* (2013.01)

(58) Field of Classification Search
CPC .. G06F 21/6254; G06F 21/64; G06F 16/2379; G06F 21/602; H04L 9/30; H04L 9/3242; H04L 9/3239; H04L 2209/38
See application file for complete search history.

(56) References Cited

U.S. PATENT DOCUMENTS

| 4,309,569 A | 1/1982 | Merkle |
| 5,005,200 A | 4/1991 | Fisher |
| 5,901,229 A | 5/1999 | Fujisaki et al. |

(Continued)

FOREIGN PATENT DOCUMENTS

| JP | 2005-260490 A | 9/2005 |
| JP | 2006-179016 A | 7/2006 |

(Continued)

OTHER PUBLICATIONS

G. Zyskind, O. Nathan and A.'. Pentland, "Decentralizing Privacy: Using Blockchain to Protect Personal Data," 2015 IEEE Security and Privacy Workshops, 2015, pp. 180-184. (Year: 2015).*

(Continued)

*Primary Examiner* — Michael R Vaughan
(74) *Attorney, Agent, or Firm* — Cooley LLP

(57) ABSTRACT

In some embodiments, a method can include retrieving, from a data management server, a public key associated with a relying party. The method can further include encrypting and using the public key, a user profile data to define encrypted user profile data. The method can further include transmitting, via the data management server, the encrypted user profile data to a compute device associated with the relying party that (1) decrypts the encrypted user profile data using a private key corresponding to the public key to define decrypted user profile data, (2) generates a hash value of the decrypted user profile data, and (3) compares the hash value of the decrypted user profile data and a hash value of the user profile data stored in a distributed database to determine integrity of the decrypted user profile data.

13 Claims, 4 Drawing Sheets

(51) Int. Cl.
*G06F 21/64* (2013.01)
*G06F 21/60* (2013.01)

(56) References Cited

U.S. PATENT DOCUMENTS

| | | |
|---|---|---|
| 5,923,763 A | 7/1999 | Walker |
| 5,996,076 A | 11/1999 | Rowney |
| 6,088,717 A | 7/2000 | Reed et al. |
| 6,310,966 B1 | 10/2001 | Dulude et al. |
| 6,785,815 B1 | 8/2004 | Serret-Avila |
| 6,792,536 B1 | 9/2004 | Teppler |
| 7,043,635 B1 | 5/2006 | Keech |
| 7,225,161 B2 | 5/2007 | Lam et al. |
| 7,451,116 B2 | 11/2008 | Parmelee et al. |
| 7,502,467 B2 | 3/2009 | Brainard et al. |
| 7,873,573 B2 | 1/2011 | Realini |
| 8,056,822 B2 | 11/2011 | Bourrieres |
| 8,078,880 B2 | 12/2011 | Nanda et al. |
| 8,249,965 B2 | 8/2012 | Tumminaro |
| 8,502,060 B2 | 8/2013 | Ribner |
| 8,607,358 B1 | 12/2013 | Shankar et al. |
| 8,744,076 B2 | 6/2014 | Youn |
| 8,832,807 B1 | 9/2014 | Kuo et al. |
| 8,966,276 B2 | 2/2015 | Nanopoulos et al. |
| 9,059,858 B1 | 6/2015 | Giardina et al. |
| 9,135,787 B1 | 9/2015 | Russell et al. |
| 9,172,699 B1 | 10/2015 | Vazquez et al. |
| 9,189,788 B1 | 11/2015 | Robinson et al. |
| 9,240,058 B1 | 1/2016 | Amacker |
| 9,288,047 B2 | 3/2016 | Brouwer et al. |
| 9,331,856 B1 | 5/2016 | Song |
| 9,397,985 B1 | 7/2016 | Seger et al. |
| 9,560,023 B2 * | 1/2017 | Wilson ............... H04L 67/141 |
| 9,608,822 B2 | 3/2017 | Lochmatter et al. |
| 9,646,150 B2 | 5/2017 | Toth |
| 9,679,276 B1 | 6/2017 | Cuende |
| 9,722,790 B2 | 8/2017 | Ebrahimi |
| 9,876,646 B2 | 1/2018 | Ebrahimi et al. |
| 9,887,975 B1 | 2/2018 | Gifford et al. |
| 9,948,467 B2 | 4/2018 | King |
| 10,007,826 B2 | 6/2018 | Ebrahimi et al. |
| 10,007,913 B2 | 6/2018 | Ebrahimi |
| 10,163,105 B1 | 12/2018 | Ziraknejad et al. |
| 10,255,419 B1 | 4/2019 | Kragh |
| 10,257,179 B1 | 4/2019 | Saylor et al. |
| 10,341,091 B2 | 7/2019 | Keranen et al. |
| 10,341,123 B2 | 7/2019 | Ebrahimi et al. |
| 10,417,219 B1 | 9/2019 | Yang et al. |
| 10,498,541 B2 | 12/2019 | Ebrahimi et al. |
| 10,498,542 B2 | 12/2019 | Ebrahimi et al. |
| 10,509,932 B2 | 12/2019 | Ebrahimi et al. |
| 10,587,609 B2 | 3/2020 | Ebrahimi et al. |
| 10,657,532 B2 | 5/2020 | Ebrahimi |
| 10,740,584 B2 | 8/2020 | Ebrahimi et al. |
| 10,805,085 B1 | 10/2020 | Liang |
| 10,979,227 B2 | 4/2021 | Ebrahimi |
| 11,062,106 B2 | 7/2021 | Ebrahimi et al. |
| 11,082,221 B2 | 8/2021 | Ebrahimi et al. |
| 2001/0011350 A1 | 8/2001 | Zabetian |
| 2002/0016913 A1 | 2/2002 | Wheeler et al. |
| 2002/0071565 A1 | 6/2002 | Kurn et al. |
| 2002/0138735 A1 | 9/2002 | Felt et al. |
| 2002/0141593 A1 | 10/2002 | Kurn et al. |
| 2002/0170966 A1 | 11/2002 | Hannigan |
| 2003/0014372 A1 | 1/2003 | Wheeler et al. |
| 2003/0046159 A1 | 3/2003 | Ebrahimi |
| 2003/0070075 A1 | 4/2003 | Deguillaume et al. |
| 2003/0172273 A1 | 9/2003 | Hans |
| 2004/0064693 A1 | 4/2004 | Pabla et al. |
| 2005/0039040 A1 | 2/2005 | Ransom et al. |
| 2005/0091495 A1 | 4/2005 | Cameron et al. |
| 2005/0114447 A1 | 5/2005 | Cameron et al. |
| 2006/0041756 A1 | 2/2006 | Ashok et al. |
| 2006/0071077 A1 | 4/2006 | Suomela |
| 2006/0075255 A1 | 4/2006 | Duffy et al. |
| 2006/0256961 A1 | 11/2006 | Brainard et al. |
| 2007/0016785 A1 | 1/2007 | Guay et al. |
| 2007/0017996 A1 | 1/2007 | Xia et al. |
| 2007/0033150 A1 | 2/2007 | Nwosu |
| 2007/0118479 A1 | 5/2007 | Halsema et al. |
| 2007/0277013 A1 | 11/2007 | Rexha et al. |
| 2007/0294538 A1 | 12/2007 | Lim et al. |
| 2008/0078836 A1 | 4/2008 | Tomita |
| 2008/0116277 A1 | 5/2008 | Tomita |
| 2008/0155253 A1 | 6/2008 | Liu |
| 2008/0178008 A1 | 7/2008 | Takahashi et al. |
| 2008/0235772 A1 | 9/2008 | Janzen |
| 2008/0267511 A1 | 10/2008 | Bourrieres |
| 2009/0066478 A1 | 3/2009 | Colella |
| 2009/0232346 A1 | 9/2009 | Zilch |
| 2009/0266882 A1 | 10/2009 | Sajkowsky |
| 2010/0020970 A1 | 1/2010 | Liu |
| 2010/0023758 A1 | 1/2010 | Han |
| 2010/0052852 A1 | 3/2010 | Mohanty |
| 2010/0070759 A1 | 3/2010 | Cobos et al. |
| 2010/0088517 A1 | 4/2010 | Piersol |
| 2010/0100724 A1 | 4/2010 | Kaliski |
| 2010/0191972 A1 | 7/2010 | Kiliccote |
| 2010/0228674 A1 | 9/2010 | Ogg et al. |
| 2010/0250939 A1 | 9/2010 | Adams et al. |
| 2010/0272193 A1 | 10/2010 | Khan et al. |
| 2011/0093249 A1 | 4/2011 | Holmes et al. |
| 2011/0121066 A1 | 5/2011 | Tian |
| 2011/0231913 A1 | 9/2011 | Feng et al. |
| 2011/0286595 A1 | 11/2011 | Resch et al. |
| 2011/0302412 A1 | 12/2011 | Deng et al. |
| 2011/0307703 A1 | 12/2011 | Ogg et al. |
| 2012/0061461 A1 | 3/2012 | Bourrieres |
| 2012/0067943 A1 | 3/2012 | Saunders |
| 2012/0086971 A1 | 4/2012 | Bisbee |
| 2012/0125997 A1 | 5/2012 | Burra et al. |
| 2012/0137131 A1 | 5/2012 | Lu et al. |
| 2012/0185398 A1 | 7/2012 | Weis et al. |
| 2012/0211567 A1 | 8/2012 | Herzig |
| 2012/0297190 A1 | 11/2012 | Shen et al. |
| 2012/0297464 A1 | 11/2012 | Busch et al. |
| 2012/0308003 A1 | 12/2012 | Mukherjee |
| 2013/0010958 A1 | 1/2013 | Yao |
| 2013/0014152 A1 | 1/2013 | Maino et al. |
| 2013/0037607 A1 | 2/2013 | Bullwinkel |
| 2013/0065564 A1 | 3/2013 | Conner |
| 2013/0111208 A1 | 5/2013 | Sabin et al. |
| 2013/0145152 A1 | 6/2013 | Maino |
| 2013/0153666 A1 | 6/2013 | Edwards |
| 2013/0159021 A1 | 6/2013 | Felsher |
| 2013/0173915 A1 | 7/2013 | Haulund et al. |
| 2013/0198822 A1 | 8/2013 | Hitchcock et al. |
| 2013/0228624 A1 | 9/2013 | Byrd et al. |
| 2013/0246261 A1 | 9/2013 | Purves et al. |
| 2013/0262309 A1 | 10/2013 | Gadotti |
| 2013/0262857 A1 | 10/2013 | Neuman et al. |
| 2013/0290733 A1 | 10/2013 | Branton et al. |
| 2013/0305059 A1 | 11/2013 | Gormley et al. |
| 2013/0311768 A1 | 11/2013 | Fosmark et al. |
| 2013/0318354 A1 | 11/2013 | Entschew et al. |
| 2013/0333009 A1 | 12/2013 | Mackler |
| 2014/0001253 A1 | 1/2014 | Smith |
| 2014/0006247 A1 | 1/2014 | Chai et al. |
| 2014/0006806 A1 | 1/2014 | Corella et al. |
| 2014/0032913 A1 | 1/2014 | Tenenboym |
| 2014/0084067 A1 | 3/2014 | Vanderhulst |
| 2014/0093144 A1 | 4/2014 | Feekes |
| 2014/0208403 A1 | 7/2014 | Lu et al. |
| 2014/0223175 A1 | 8/2014 | Bhatnagar |
| 2014/0237565 A1 | 8/2014 | Fleysher |
| 2014/0254796 A1 | 9/2014 | Li et al. |
| 2014/0256423 A1 | 9/2014 | Williams |
| 2014/0282961 A1 | 9/2014 | Dorfman et al. |
| 2014/0289842 A1 | 9/2014 | Cornick et al. |
| 2014/0304517 A1 | 10/2014 | Chidambaram et al. |
| 2014/0310779 A1 * | 10/2014 | Lof ............... G06F 21/10 726/4 |
| 2014/0344015 A1 | 11/2014 | Puertolas-Montanes et al. |
| 2015/0047000 A1 | 2/2015 | Spencer, III et al. |

(56) References Cited

U.S. PATENT DOCUMENTS

| | | |
|---|---|---|
| 2015/0081567 A1 | 3/2015 | Boyle et al. |
| 2015/0095352 A1 | 4/2015 | Lacey |
| 2015/0095999 A1 | 4/2015 | Toth |
| 2015/0104013 A1 | 4/2015 | Holman et al. |
| 2015/0106626 A1 | 4/2015 | Kremp et al. |
| 2015/0178515 A1 | 6/2015 | Cooley et al. |
| 2015/0193695 A1* | 7/2015 | Cruz Mota ......... H04L 63/1425 706/12 |
| 2015/0244690 A1 | 8/2015 | Mossbarger |
| 2015/0262138 A1 | 9/2015 | Hudson |
| 2015/0269389 A1 | 9/2015 | Lee |
| 2015/0269614 A1 | 9/2015 | Kramer |
| 2015/0278805 A1 | 10/2015 | Spencer, III et al. |
| 2015/0278820 A1 | 10/2015 | Meadows |
| 2015/0302401 A1 | 10/2015 | Metral |
| 2015/0332283 A1 | 11/2015 | Witchey |
| 2015/0356523 A1 | 12/2015 | Madden |
| 2015/0356555 A1 | 12/2015 | Pennanen |
| 2015/0365436 A1 | 12/2015 | Shenefiel et al. |
| 2016/0005032 A1 | 1/2016 | Yau et al. |
| 2016/0012465 A1 | 1/2016 | Sharp |
| 2016/0028452 A1 | 1/2016 | Chu et al. |
| 2016/0028552 A1 | 1/2016 | Spanos et al. |
| 2016/0072800 A1 | 3/2016 | Soon-Shiong et al. |
| 2016/0094348 A1 | 3/2016 | Takahashi |
| 2016/0098723 A1 | 4/2016 | Feeney |
| 2016/0098730 A1 | 4/2016 | Feeney |
| 2016/0125416 A1 | 5/2016 | Spencer et al. |
| 2016/0134593 A1 | 5/2016 | Gvili |
| 2016/0162897 A1 | 6/2016 | Feeney |
| 2016/0180338 A1 | 6/2016 | Androulaki et al. |
| 2016/0203572 A1 | 7/2016 | McConaghy |
| 2016/0212146 A1 | 7/2016 | Wilson |
| 2016/0217356 A1 | 7/2016 | Wesby |
| 2016/0217436 A1 | 7/2016 | Brama |
| 2016/0261411 A1 | 9/2016 | Yau et al. |
| 2016/0269403 A1 | 9/2016 | Koutenaei et al. |
| 2016/0283920 A1 | 9/2016 | Fisher et al. |
| 2016/0283939 A1 | 9/2016 | Finlow-Bates |
| 2016/0283941 A1 | 9/2016 | Andrade |
| 2016/0300234 A1 | 10/2016 | Moss-Pultz et al. |
| 2016/0314462 A1 | 10/2016 | Hong et al. |
| 2016/0328713 A1 | 11/2016 | Ebrahimi |
| 2016/0330027 A1 | 11/2016 | Ebrahimi |
| 2016/0330035 A1 | 11/2016 | Ebrahimi et al. |
| 2016/0337351 A1 | 11/2016 | Spencer et al. |
| 2016/0351080 A1 | 12/2016 | Bhatnagar et al. |
| 2016/0373440 A1 | 12/2016 | Mather et al. |
| 2017/0041296 A1 | 2/2017 | Ford |
| 2017/0048252 A1 | 2/2017 | Straub et al. |
| 2017/0085377 A1 | 3/2017 | Pogmore et al. |
| 2017/0103389 A1 | 4/2017 | Sorensen et al. |
| 2017/0109735 A1 | 4/2017 | Sheng et al. |
| 2017/0180128 A1 | 6/2017 | Lu |
| 2017/0200160 A1 | 7/2017 | Kumar |
| 2017/0228731 A1 | 8/2017 | Sheng et al. |
| 2017/0236121 A1 | 8/2017 | Lyons et al. |
| 2017/0255805 A1 | 9/2017 | Ebrahimi et al. |
| 2017/0257358 A1 | 9/2017 | Ebrahimi et al. |
| 2017/0279788 A1 | 9/2017 | Rosenblum et al. |
| 2017/0324711 A1 | 11/2017 | Feeney |
| 2017/0344987 A1 | 11/2017 | Davis |
| 2017/0344988 A1 | 11/2017 | Cusden et al. |
| 2017/0346851 A1 | 11/2017 | Drake |
| 2017/0357826 A1 | 12/2017 | Gouget et al. |
| 2017/0359723 A1 | 12/2017 | Pal et al. |
| 2017/0372300 A1 | 12/2017 | Dunlevy et al. |
| 2018/0068103 A1 | 3/2018 | Pitkanen et al. |
| 2018/0077144 A1 | 3/2018 | Gangawane et al. |
| 2018/0082050 A1 | 3/2018 | Flink et al. |
| 2018/0082256 A1 | 3/2018 | Tummuru et al. |
| 2018/0144153 A1 | 5/2018 | Pead |
| 2018/0173906 A1 | 6/2018 | Rodriguez et al. |
| 2018/0176017 A1 | 6/2018 | Rodriguez et al. |
| 2018/0205556 A1 | 7/2018 | Rieul |
| 2018/0240107 A1 | 8/2018 | Andrade |
| 2018/0248699 A1 | 8/2018 | Andrade |
| 2018/0308098 A1 | 10/2018 | Ebrahimi |
| 2018/0343120 A1 | 11/2018 | Andrade |
| 2018/0359103 A1 | 12/2018 | Geupel |
| 2019/0005470 A1 | 1/2019 | Uhr et al. |
| 2019/0149537 A1 | 5/2019 | Ebrahimi et al. |
| 2019/0163896 A1 | 5/2019 | Balaraman et al. |
| 2019/0173872 A1* | 6/2019 | Arora ................. G06Q 20/3825 |
| 2019/0179884 A1* | 6/2019 | Wooldridge .......... G06F 40/143 |
| 2019/0182042 A1 | 6/2019 | Ebrahimi et al. |
| 2019/0228178 A1 | 7/2019 | Sharma et al. |
| 2019/0334724 A1* | 10/2019 | Anton ................... H04L 63/102 |
| 2019/0342096 A1 | 11/2019 | Starosielsky et al. |
| 2020/0127826 A1 | 4/2020 | Ebrahimi et al. |
| 2020/0127832 A1 | 4/2020 | Ebrahimi |
| 2020/0145219 A1 | 5/2020 | Sebastian et al. |
| 2020/0186505 A1* | 6/2020 | Amar .................. H04W 12/069 |
| 2020/0265202 A1 | 8/2020 | Ebrahimi et al. |
| 2020/0267003 A1 | 8/2020 | Ebrahimi et al. |
| 2020/0344062 A1* | 10/2020 | Haidar .................... G06F 21/64 |
| 2021/0064780 A1* | 3/2021 | Riedel ................ G06Q 20/3674 |
| 2021/0098092 A1* | 4/2021 | Katuwal ................ G16H 10/60 |
| 2021/0192075 A1* | 6/2021 | Sweeney ................. G06F 21/62 |
| 2021/0192166 A1 | 6/2021 | Ebrahimi et al. |

FOREIGN PATENT DOCUMENTS

| | | |
|---|---|---|
| JP | 2008-518335 A | 5/2008 |
| JP | 2012-114907 A | 6/2012 |
| KR | 10-2013-0055794 A | 5/2013 |
| WO | WO 2016/179334 A1 | 11/2016 |
| WO | WO 2017/152150 A1 | 9/2017 |
| WO | WO 2018/145127 A1 | 8/2018 |
| WO | WO 2019/113552 A1 | 6/2019 |

OTHER PUBLICATIONS

[Author Unknown] "Merkle Tree". Wikipedia (May 17, 2020), https://en.wikipedia.org/w/index.php?title=Merkle_tree&oldid=957154565; 5 pages.

[Author Unknown] "Welcome to xDai STAKE—The first-ever USD stable blockchain and multi-chain staking token", www.xdaichain.com, Retrieved on Mar. 26, 2021, 6 pages.

Ramirez, Noah, "Data Privacy Laws: What You Need to Know in 2020". Osano, Austin, Texas, www.osano.com/articles/data-privacy-laws; Year: 2020, updated Nov. 8, 2020, 6 pages.

Barreto, P. S. L. M. et al., (2001) "Fast hashing onto elliptic curves over fields of characteristic 3," [Online], Cryptology ePrint Archive: Report 2001/098, Received Nov. 15, 2001, Retrieved from the Internet: <URL: https://eprint.iacr.org/2001/098/>, 12 pages.

Biggs, J., "Your Next Passport Could Be on the Blockchain", Oct. 31, 2014, 6 pages.

Boneh, D. et al., (2001) "Short signatures from the Weil pairing," International Conference on the Theory and Application of Cryptology and Information Security, ASIACRYPT 2001: Advances in Cryptology, [Online], Retrieved from the Internet: <URL: https://www.iacr.org/archive/asiacrypt2001/22480516.pdf>, pp. 516-534.

Dillet, R., "Stampery Now Lets You Certify Documents Using the Blockchain and Your Real Identity," Nov. 20, 2015, 6 pages.

Drew-Cordell, "Developer Creates Blockchain Passport Technology Based on Bitcoin", Oct. 31, 2014, 16 pages.

Ellis, C., "Create Your Own Blockchain ID", Bitnation, Oct. 24, 2014, 14 pages.

Ellison, C. et al., (2000) "Ten risks of PKI: What you're not being told about public key infrastructure," Computer Security Journal, vol. 16, No. 1, pp. 1-8.

GitHub, Inc., "World Citizenship, Creating Affordable Decentralised Passport Services Using Available Cryptographic Tools," (Oct. 2014), Retrieved from the Internet on Nov. 17, 2017, <URL: https://github.com/MrChrisJ/World-Citizenship>, 12 pages.

Gupta, V., "State in a Box—Identity Services Architecture," CheapID, 2006-2009, 42 pages.

(56) References Cited

OTHER PUBLICATIONS

Kirk, J., "Could the Bitcoin network be used as an ultrasecure notary service?", IDG News Service, Computerworld, Inc., May 23, 2013, 3 pages.
Menezes, A. J. et al., Chapter 9: Handbook of Applied Cryptography, CRC Press, Boca Raton, FL, pp. 321-383 (Oct. 1996).
Nakamoto, S., "Bitcoin: A peer-to-peer electronic cash system," Retrieved from the Internet: <URL:http://www.bitcoin.org>, Jan. 2009, 9 pages.

* cited by examiner

200

```
┌─────────────────────────────────────────────────────────────┐
│ Receive, at a data management server and from a set of data │
│ repositories, user profile data of a user of a personal compute device │
│ 201                                                         │
└─────────────────────────────────────────────────────────────┘
                              │
                              ▼
┌─────────────────────────────────────────────────────────────┐
│ Generate, at the data management server, a hash value of the user │
│ profile data 202                                            │
└─────────────────────────────────────────────────────────────┘
                              │
                              ▼
┌─────────────────────────────────────────────────────────────┐
│ Store the hash value of the user profile data in a distributed database │
│ 203                                                         │
└─────────────────────────────────────────────────────────────┘
                              │
                              ▼
┌─────────────────────────────────────────────────────────────┐
│ Send the user profile data to the personal compute device 204 │
└─────────────────────────────────────────────────────────────┘
                              │
                              ▼
┌─────────────────────────────────────────────────────────────┐
│ Remove, after the generating and sending, the user profile data from │
│ the data management server 205                              │
└─────────────────────────────────────────────────────────────┘
                              │
                              ▼
┌─────────────────────────────────────────────────────────────┐
│ Receive encrypted user profile data from the personal compute │
│ device. The encrypted user profile data encrypted using a public key │
│ associated with a relying party identified by the user of the personal │
│ compute device 206                                          │
└─────────────────────────────────────────────────────────────┘
                              │
                              ▼
┌─────────────────────────────────────────────────────────────┐
│ Send the encrypted user profile data to a compute device associated │
│ with the relying party such that the compute device associated with │
│ the relying party (1) decrypts the encrypted user profile data using a │
│ private key corresponding to the public key to define decrypted user │
│ profile data, (2) generates a hash value of the decrypted user profile │
│ data, and (3) compares the hash value of the decrypted user profile │
│ data and the hash value of the user profile data in the distributed │
│ database to determine integrity of the decrypted user profile data 207 │
└─────────────────────────────────────────────────────────────┘
```

Receive, at a personal compute device and via a data management server, user profile data of a user of the personal compute device from a set of data repositories 301

Store, at the personal compute device, the user profile data 302

Retrieve, from the data management server, a public key associated with a relying party 303

Encrypt, at the personal compute device and using the public key, the user profile data to define encrypted user profile data 304

Transmit the encrypted user profile data from the personal compute device to the relying party via the data management server such that the relying party (1) decrypts the encrypted user profile data using a private key corresponding to the public key to define decrypted user profile data, (2) generates a hash value of the decrypted user profile data, and (3) compares the hash value of the decrypted user profile data and a hash value of the user profile data stored in a distributed database to determine integrity of the decrypted user profile data 305

Receive, from the relying party and via the data management server, a response based on the user profile data 306

```
┌─────────────────────────────────────────────────────────────────┐
│ Receive a request and encrypted user profile data from a        │
│ personal compute device and via a data management server. The   │
│ encrypted user profile data is encrypted using a public key     │
│ associated with the relying party compute device 401            │
└─────────────────────────────────────────────────────────────────┘
                                 │
                                 ▼
┌─────────────────────────────────────────────────────────────────┐
│ Decrypt the encrypted user profile data using a private key     │
│ corresponding to the public key to define decrypted user        │
│ profile data 402                                                │
└─────────────────────────────────────────────────────────────────┘
                                 │
                                 ▼
┌─────────────────────────────────────────────────────────────────┐
│ Generate a first hash value using the decrypted user profile    │
│ data 403                                                        │
└─────────────────────────────────────────────────────────────────┘
                                 │
                                 ▼
┌─────────────────────────────────────────────────────────────────┐
│ Retrieve, from a distributed database, a second hash value,     │
│ the second hash value associated with an identifier associated  │
│ with the personal compute device 404                            │
└─────────────────────────────────────────────────────────────────┘
                                 │
                                 ▼
┌─────────────────────────────────────────────────────────────────┐
│ Compare the first hash value and the second hash value to       │
│ determine integrity of the decrypted user profile data 405      │
└─────────────────────────────────────────────────────────────────┘
                                 │
                                 ▼
┌─────────────────────────────────────────────────────────────────┐
│ Evaluate the request based on the decrypted user profile data   │
│ 406                                                             │
└─────────────────────────────────────────────────────────────────┘
                                 │
                                 ▼
┌─────────────────────────────────────────────────────────────────┐
│ Send, to the personal compute device and via the data           │
│ management server, a response to the request based on the       │
│ user profile data 407                                           │
└─────────────────────────────────────────────────────────────────┘
```

FIG. 4

APPARATUS, SYSTEMS AND METHODS FOR STORING USER PROFILE DATA ON A DISTRIBUTED DATABASE FOR ANONYMOUS VERIFICATION

TECHNICAL FIELD

The present disclosure relates to the field of computer network communication systems, and in particular to methods and apparatus of storing user profile data on a distributed database for anonymous verification by relying parties.

BACKGROUND

Some known methods for verification of user profile data of a user based on a request of the user remain disadvantageous to the user, inefficient, unsecure, and/or error-prone. For example, some known methods for verification of user profile data include accessing a user's data including medical data, financial data, and/or personal data, without the user's control or permission. Access to the user's data without the user's control or permission can be disadvantageous to the user and, in some instances, lead to identity theft, misuse of the user profile data, discomfort for the user, and/or the like. Thus, a need exists for computer network communication methods, apparatus, and systems that can securely, reliably collect users profile data as well as anonymously, effectively pass and verify user profile data.

SUMMARY

In some embodiments, a method can include retrieving, from a data management server, a public key associated with a relying party. The method can further include encrypting and using the public key, a user profile data to define encrypted user profile data. The method can further include transmitting, via the data management server, the encrypted user profile data to a compute device associated with the relying party that (1) decrypts the encrypted user profile data using a private key corresponding to the public key to define decrypted user profile data, (2) generates a hash value of the decrypted user profile data, and (3) compares the hash value of the decrypted user profile data and a hash value of the user profile data stored in a distributed database to determine integrity of the decrypted user profile data.

BRIEF DESCRIPTION OF THE DRAWINGS

FIG. 2 is a flowchart of a method of encrypting and storing user profile data on a distributed database for verification by a relying party, according to an embodiment.

FIG. 3 is a flowchart of a method for sending an encrypted user profile to a relying party for verification and response, according to an embodiment.

FIG. 4 is a flowchart of a method for receiving an encrypted user profile data and verifying the encrypted user profile data, according to an embodiment.

DETAILED DESCRIPTION

Figure 1:
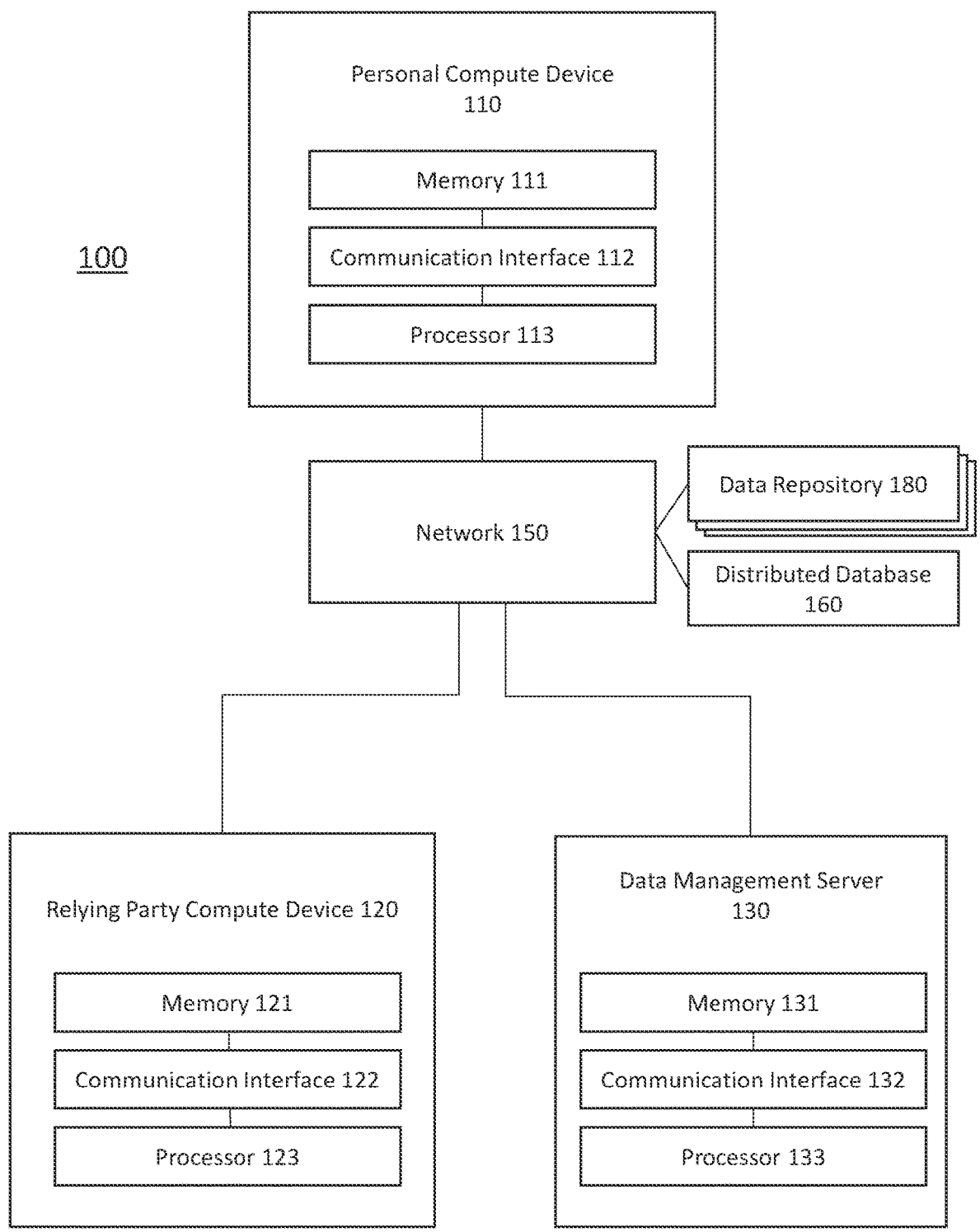
FIG. 1 is a block diagram of a data management system, according to an embodiment.

Non-limiting examples of various aspects and variations of the embodiments are described herein and illustrated in the accompanying drawings.

One or more embodiments described herein generally relate to methods, apparatus and systems for anonymous and secure storage of user profile data (e.g., medical data, contact information, bioinformatic data, personal data, and/or the like) of a user on a distributed database for anonymous analysis and/or verification by relying parties. Data management systems and methods described herein can automatically and securely process a high number of orders or requests for verification by relying parties. For example, the management systems and methods described herein can receive a request from an anonymized user profile, verify integrity of user profile data for a requester of the request, and generate a response to the request in a highly secure and time-efficient manner. As a result, using the management systems and methods described herein can enhance efficiency, security, privacy, and user satisfaction compared to some known methods for verification of user profile data.

For example, the user of the management systems and methods described herein, does not have to enter information multiple times on a personal compute device of the user, as the user shops for the best deal (e.g., for a mortgage, a car loan, a credit card, a passport application, and/or the like). Therefore, the management systems and methods described herein can provide control to the user over of dissemination of the user's data (e.g., personal data, education data, health records, financial data, and/or the like).

The user profile data used by the management systems and methods described herein is highly secure and, in some instances, is referred to as triple masked data. In some instances, the user profile data is (a) end-to-end encrypted, (b) identity stripped, and (c) distributed database (e.g., blockchain) verified. The management systems and methods described herein can use end-to-end encryption on a device (e.g., personal compute device 110 as shown and described with respect to FIG. 1) and/or on a server (e.g., data management server 130 as shown and described with respect to FIG. 1) such that no data can be viewed in transit (e.g., propagating through a communication channel) or when stored in the device and/or on the server. The data management systems and methods described herein can also identity strip data such that medical data, financial data, and/or the like are separated from real world identity (e.g., bioinformatic data, personally identifiable data, etc.). The management systems and methods described herein can also use the distributed database verification of data such that the user profile is verifiable, and the user has a choice whether to share the user profile with a relying party. Moreover, the distributed database verification of user profile data can allow the user to trace the user profile data (e.g., to him and for what purpose the user profile data was shared).

FIG. 1 is a block diagram of a data management system 100, according to an embodiment. The data management system 100 can include a personal compute device 110, a relying party compute device 120, and a data management server 130, that can securely generate a response (e.g., a verification response) to a request (e.g., a verification request). The personal compute device 110, the relying party compute device 120, and the data management server 130, each can be/include a hardware-based computing device(s) and/or a multimedia device(s), such as, for example, a computer(s), a server(s), a desktop device(s), a laptop(s), a smartphone(s), a tablet(s), and/or the like.

The personal compute device 110 can be, for example, a phone, a tablet, a desktop computer, a laptop computer and/or the like. The personal compute device 110 can include a memory 111, a communication interface 112, and a processor 113. The memory (e.g., a random-access memory (RAM), a hard drive, a flash drive, and/or the like) of the personal compute device 110 can store data (e.g., user profile data, a request(s), a response(s), a document file, a chart, a token, an encrypted file, and/or the like), and/or code that includes instructions to cause the processor 113 to perform one or more processes or functions (e.g., a code to encrypt user profile data). The communication interface 112 (e.g., a network interface card (NIC), a Wi-Fi® transceiver, a Bluetooth® transceiver, and/or the like) of the personal compute device 110 can be a hardware component that facilitates data communication between the personal compute device 110 and external devices (e.g., the relying party compute device 120, the data management server 130, and/or the like). The processor 113 (a central processing unit (CPU), a graphics processing unit (GPU), a field-programmable gate array (FPGA), an application-specific integrated circuit (ASIC), and/or the like) can be, for example, a hardware-based integrated circuit (IC) or any other suitable processing device configured to run or execute a set of instructions/code.

The memory 111 of personal compute device 110 can store a mobile web software instantiation, an application (also referred to as an 'app' or a 'software'), a software instantiation that is a hybrid of the mobile web instantiation and the application, a web browser, and/or the like, that can include a first set of software services (e.g., a blockchain service, a user profile generating service, a request generating service, an encryption software service, and/or the like) and/or an application programming interface (API) to use a second set of software services (e.g., a relying party finder service, a user profile data fetching service, and/or the like) provided by the data management server 130. The personal compute device 110 can transmit data (e.g., a request) to the relying party compute device 120 and/or to the data management server 130 and receive data (e.g., a response) from the relying party compute device 120 and/or from the data management server 130 via a network 150. In some instances, the personal compute device 110 can include an encrypted data repository (e.g., as part of the memory 111). The encrypted data repository can be used to store personal data.

The relying party compute device 120 includes a memory 121, a communication interface 122 and/or a processor 123 that are structurally and/or functionally similar to the memory 111, the communication interface 112 and/or the processor 113, respectively, as described with respect to the personal compute device 110. The relying party compute device 120 can be a compute device (e.g., a laptop, a desktop, a mobile phone, and/or the like) of a relying party (e.g., a government, a healthcare provider, an insurance company, a bank, a car dealership, a realtor, a mortgage provider, etc.). The relying party compute device 120 can also store an application (also 'app' or a 'software') that can include a third set of software services (e.g., a blockchain service, a report generation service, a spending power calculation service, an encryption software service, and/or the like) and/or an application programming interface (API) to securely connect to and receive/send data from/to the data management server 130. The relying party compute device 120 can receive data (e.g., a request) and/or transmit data (e.g., a response to the request) from/to the personal compute device 110 and/or the data management server 130.

The data management server 130 includes a memory 131, a communication interface 132 and/or a processor 133 that are structurally and/or functionally similar to the memory 111, the communication interface 112 and/or the processor 113 as described with respect to the personal compute device 110. In some embodiments, the data management server 130 can include one or more memories and/or one or more processors. For example, the data management server 130 can include multiple databases, compute devices, and/or high-performance servers that can be at physically separate locations and connected via the network 150. The data management server 130 can include, for example, a network of electronic memories (e.g., memories of a database in a data center), a network of magnetic memories (e.g., memories of a database in a data center), a server(s), a blade server(s), a network attached storage(s), and/or the like. In some implementations, a medium of the data management server 130 can include a memory, a communication interface and/or a processor that are application specific (e.g., deep learning storage server, parallel computing device, etc.) and that are structurally and/or functionally different than the memory, the communication interface and the processor as described with respect to the personal compute device 110.

The personal compute device 110, the relying party compute device 120, and the data management server 130 communicate data (e.g., a request, a response, user profile data, encrypted user profile data, and/or the like) via the network 150. The network 150 can be or include, for example, a digital telecommunication network of servers and/or compute devices. The servers and/or computes device of the network 150 can be connected via one or more wired or wireless communication networks (not shown) to share resources such as, for example, data storage and/or computing. The wired or wireless communication networks between the personal compute device 110, the relying party compute device 120, the data management server 130, servers of the network 150, and/or compute devices of the network 150 can include one or more communication channels, for example, a radio frequency (RF) communication channel(s), a fiber optic commination channel(s), and/or the like. The network 150 can be and/or include, for example, the Internet, an intranet, a local area network (LAN), a wide area network (WAN), and/or the like.

The data management server 130 can perform the second set of software services. In some implementations, each software service from the second set of software services can be implemented in a set of code representing instructions that can be stored in the memory 131 and executed by the processor 133. The second set of software services of the data management server 130 can include, for example, a data fetching service, a data validation and normalization service, a know-your-customer (KYC) validation service, a distributed database service, an encryption service, and/or the like.

In some instances, the data fetching service of the data management server 130 can connect to a set of data repositories 180 (e.g., Plaid®, Fincity®, and/or the like) via API gateways to receive data about (and at a request of) a user of the personal compute device 110. The set of data repositories 180 can be/include, for example, a financial data repository, a credit data repository, a license (e.g., passport, driver's license) data repository, a healthcare data repository, and/or the like. In some instances, the data validation and normalization service can perform data validation (e.g., validating a number is used in a numerical data field, validating correct calendar format for a date field, and/or the like) on the user profile data received by the data fetching service, and can normalize the user profile data to a metadata schema (e.g., in a JavaScript Object Notation (JSON) format) to generate a normalized user profile data.

In some instances, the know-your-customer (KYC) validation service can connect to a third-party KYC gateway and validate, for example, identity data (e.g., a legal name, a home address, an email address, a mobile phone number, a social security number, a marital status, a number of children, biometric data, and/or the like) associated with a user, to prevent against identity fraud and receive an indication of an amount a risk(s) associated with the user. In some instances, the distributed database service can remove any personally identifiable information from the data to define anonymized user profile data and store a hash value generated (e.g., by the data management server 130 using any suitable hash function) from anonymized user profile data on a distributed database 160 (e.g., distributed ledger, blockchain, Ethereum®, and/or the like). In some instances, the encryption service performs an end-to-end encryption to secure personally identifiable information (PII).

In use, the data management server 130 receives user profile data (e.g., financial data, health data, contact information, and/or the like) of a user of the personal compute device 110 from the set of data repositories 180. In some instances, the user profile data include identity data (e.g., email address, phone number, home address, social security number, and/or the like) that could be used to identity the user of the personal compute device 110. The data management server 130 separates and/or removes the identity data of the user from the user profile data to generate anonymized user profile data. Then, the data management server 130 hashes the anonymized user profile data to generate a first hash value using any suitable hash function (e.g., Secure Hashing Algorithm (SHA)-1, SHA-2, SHA-3, SHA-256, Message Digest 5 (MD5), MD6, etc.). The data management server 130 then stores the first hash value with an anonymous user identifier (also known as 'user ID' or 'identifier') in the distributed database 160. In some instances, the identifier can be a public key associated with the personal compute device 110. The data management server 130 then sends the anonymized user profile data to the user device and removes the anonymized user profile data and any identity data (other than contact information) from the memory 131.

The personal compute device 110 receives, using the communication interface 112, and stores the anonymized user profile data of the user of the personal compute device 110 in the memory 111. The data management server 130 can store public keys associated with a set of participating personal compute devices (including the personal compute device 110) and a set of relying party compute devices (including the relying party compute device 120). Therefore, the personal compute device 110 can retrieve, from the data management server, a public key associated with a relying party (e.g., the relying party compute device 120). The personal compute device 110 can encrypt the anonymized user profile data using the public key associated with the relying party to define an encrypted anonymized user profile data. The personal compute device 110 can then transmit, via the data management server, the encrypted anonymized user profile data and a request (e.g., a verification request) to the relying party compute device 120.

The relying party compute device 120 can receive the request and the encrypted anonymized user profile (encrypted with the public key associated with the relying party) sent form the personal compute device 110 and via the data management server 130 (not storing a private key of the relying party compute device 120 and thus not able to decrypt the encrypted anonymized user profile). The relying party compute device 120 can then decrypt the encrypted user profile data using a private key corresponding to the public key to define decrypted anonymized user profile data. The decrypted user profile is originated from the anonymized user profile data stored at the memory 111 of the personal compute device 110, and therefore, itself is anonymized. The relying party compute device 120 generates a second hash value using the decrypted user profile data and the same hash function used above to generate the first hash value. The relying party compute device 120 retrieves the first hash value associated with the identifier associated with the personal compute device 110 from the distributed database 160 (e.g., a blockchain, a sidechain, Ethereum®, a distributed ledger, xDai, R3 Corda®, distributed concurrence ledgers (Disledger®), HashGraph®, and/or the like). The identifier can be sent from the data management server 130 when sending the encrypted anonymized user profile to the relying party compute device 120. In some instances, the second hash value can be stored in the distributed database 160 in association with the public key associated with the personal compute device 110. The relying party compute device 120 can then determine integrity of the decrypted user profile data by comparing the first hash value and the second hash value. If the first hash value and the second hash value are equal, then integrity of the decrypted user profile data is confirmed. If the first hash value and the second hash value are not equal, however, the decrypted user profile data has changed and is not verified.

The relying party compute device 120 can then analyze decrypted user profile data to evaluate the request. Based on evaluation of the request, the relying party compute device 120 can generate a response to the request. In one example, the response can be, for example, a Boolean yes/no response to the request. In another example, the response can be a score within a normalized score range (e.g., from 0 to 1, from 0 to 100, from 300 to 850, and/or the like). The relying party compute device 120 can then encrypt the response (e.g., using a public key of the personal compute device 110) to generate an encrypted response and send the encrypted response to the personal compute device 110 via the data management server 130. Thus, the response from the relying party compute device can be determined without use of personally identifiable information.

After the response is provided from the relying party compute device 120 to the personal compute device 110, a user of the personal compute device 110 can decide what to do with the response. For example, if the response is an acceptance of an offer, the user of the personal compute device 110 can decide whether to proceed with the offer and provide personally-identifiable information to the relying party compute device 120 to complete the offer. In this manner, the user can first obtain an acceptance from the relying party before determining to provide personally-identifiable information to the relying party.

While shown and described above as evaluating the request based on an anonymized user profile, in some implementations, a portion of user profile data can be used to verify a request to reduce data storage, data communication, data shared, and/or data processing used in verification of the request. For example, in some implementations, a portion of the anonymized user profile data (rather than the entire anonymized user profile) is hashed and stored in the distributed database 160. Similarly, the personal compute device 110 sends the portion of the anonymized user profile data (rather than the entire anonymized user profile) to the relying party compute device 120. Using a portion of the anonymized user profile data (instead of complete anonymized user profile data) to verify a request can reduce amount of data storage used in the above-mentioned procedure. Moreover, using a portion of the anonymized user profile data can allow the user to provide user profile data to the relying party that is targeted to the request. This reduces the amount of data the user shares with the relying party.

While shown and described above as certain functions and/or processes being performed at the data management server 130 and the personal compute device 110, in some implementations, certain processes described as being performed at the data management server 130 can be performed at the personal compute device 110 and/or certain processes described as being performed at the personal compute device 110 can be performed at the data management server 130. For example, in some implementations, the personal compute device 110 can include an application that performs much of the functions described as being performed by the data management server 130. For example, anonymizing the user profile data can be performed at the personal compute device 110 (e.g., by processor 113). Moreover, in some implementations, calculating a hash value and storing the hash value on the distributed database can be performed at the personal compute device 110 (e.g., by processor 113).

Although the personal compute device 110, the relying party compute device 120, and the data management server 130 are shown and described as singular devices and as part of a singular system, it should be understood that, in some embodiments, one or more personal compute devices, one or more relying party compute devices, and/or one or more data management servers can be used in the data management system 100.

In some implementations, the data management server 130 can store public keys and/or another identifier associated with the one or more personal compute devices (e.g., personal compute device 110) and one or more relying party compute devices (e.g., relying party compute device 120). Such an identifier of the personal compute device 110 can be stored in memory 131 associated with codes used to denote demographic information, ranges associated with demographic information, anonymized contact information for a user of the personal compute device 110 and/or the like. In some implementations, such information can be stored in separate tables, separate databases and/or separate devices to reduce the risk of an attacker obtaining information that could be used to identify a user of the personal compute device 110. For example, a first table can store the identifier of the personal compute device 110 (e.g., an anonymized identifier such as a public key) associated with one or more codes for demographic information. As second table can store the codes for demographic information associated with demographic information (e.g., age, sex, etc.) or ranges of demographic information (e.g., an income range, an age range, a geographic area, a credit score range, a range of a medical history value, etc.). A third table can store the identifier of the personal compute device 110 associated with contact information (e.g., an email address, a way to send a notification to the application on the personal compute device 110, a phone number, etc.). In some implementations, such contact information can be anonymized and not stored as linked to the user of the personal compute device 110.

A relying party from the one or more relying party compute devices (e.g., relying party compute device 120) can search the one or more data management servers for a personal compute device (e.g., personal compute device 110) from the one or more personal compute devices meeting certain criteria (e.g., having demographics within a certain demographic range). The relying party compute device 120 can then identify the contact information and contact the user with a promotion without knowing the identity of the user of the personal compute device 110. For example, a user of the personal compute device 110 can have a credit score above a predetermined threshold for a promotion of a service of the relying party compute device 120. Therefore, the relying party compute device 120 can ask for and use contact information of the personal compute device 110 to send the promotion of the service to the personal compute device 110. The promotion can request that the personal compute device 110 provide the anonymized user profile data to the relying entity compute device 120 to be considered for the offer and the user of the personal compute device 110 can determine whether or not to send the anonymized user profile data.

Similarly, the data management server 130 can store information on relying parties of relying party compute devices (e.g., relying party compute device 120). Such information can include user ratings, offers, type of relying party, and/or the like. Accordingly, a personal compute device 110 from the one or more personal compute devices can search the one or more data management servers for a relying party compute device from the one or more relying party compute devices meeting certain criteria and send a request to that relying party compute device to perform an action. For example, the relying party can have a user rating above a predetermined threshold for a loan service. Therefore, the user of the personal compute device 110 can send a request for the loan service to the relying party compute device 120 (e.g., as discussed herein).

In some instances, the user can have a first personal compute device and a second compute device. The first personal compute device can be used for encrypting the user profile data (e.g., anonymized user profile data) to define an encrypted user profile data. The second personal compute device can establish a connection between the first compute device and the second personal compute device of the user. The user of the first personal compute device can authorize the second compute device to send, via the data management server, a request to the relying party compute device identified by the user at the second personal compute device.

FIG. 2 is a flowchart of a method 200 of encrypting and storing user profile data (also referred to as 'user information') on a distributed database (e.g., a blockchain) for verification by a relying party, according to an embodiment. In some implementations, a data management server (such as the data management server 130 shown and described with respect to FIG. 1) can be used to perform the method 200. At 201, user profile data of a user of a personal compute device can be received. The user profile data can be received from a set of data repositories (e.g., a health repository, a financial repository, a credit repository, and/or the like). In addition to the user profile data, in some instances, the data management server can receive identity data (e.g., a legal name, a home address, an email address, a mobile phone number, a social security number, biometric data, and/or the like) associated with the user. The identity data can be separated from the user profile data to anonymize the user profile data.

At 202, a hash value of the user profile data can be generated. The hash value can be generated using a cryptographic hash function that maps the user profile data to a bit array. A proof (a cryptographic primitive used to ensure the correctness of the data) can also be generated and can be used to verify the user profile data. More specifically, the relying party compute device can use the proof to verify integrity of the user profile data. If a character(s) changes in the user profile data, the proof cannot be used to authenticate the user profile data.

In some instances, the proof can be generated based on a Merkle tree. For example, a Merkle tree (e.g., for a payroll)

can be generated by pairing up a set of keys (e.g., salary, data of hire, number of dependent, and/or the like) and values (e.g., $100,000, Mar. 15, 2019, two dependents, and/or the like) to generate a set of pairs and generating a single hash for each pair from the set of pairs. Then two hashes from the set of hashes, generated based on the set of pairs, can be further paired to generate a subset of pairs and hash the subset of pairs further. The above hashing process can be performed until a single hash is generated. That single hash is called a Merkle root. The Merkle root can be merged or concatenated (by relying party compute device) with a user's distributed database address (e.g., Ethereum address) and signed with a cryptographic signature. Because of the cryptographic signature, the Merkle root is connected to a single user and cannot be reused by others.

In some instances, after receiving a cryptographic signature the above process or a variation of the above process can be performed to end up with the Merkle root and the user's distributed database address. The signature can be unpacked and verified by the data management server. In some instances, the signature and the Merkle root can be saved in a database of the data management server.

At 203, the hash value of the user profile data can be stored in a distributed database. In some instances, the hash value of the user profile data can be stored in the distributed databased in association with a public key or other anonymous identifier associated with the personal compute device. In some instances, before generating the hash value of the user profile data and storing the hash value of the user profile data in the distributed database, the identity data mentioned above can be separated from the user profile data such that the hash value of the user profile data is based on anonymized user profile data.

At 204, the user profile data can be sent to the personal compute device. In some implementations, the data management server can separate and/or remove the identity data of the user mentioned above from the user profile data to generate anonymized user profile data. In some instances, the data management server sends anonymized user profile data to the personal compute device in a separate payload than the identity data, making it more difficult to obtain both the anonymized user profile data and the identity data. Moreover, by sending the identity data and the anonymized user profile data to the personal compute device in separate payloads, it can be more difficult for a hacker to link the anonymized user profile data with the identity data. The personal compute device can store the user profile data separate from the identity data.

At 205, the user profile data can be removed (e.g., from the data management server) after generating the hash value of the user profile data and sending the user profile data to the personal compute device. Therefore, the user profile data is not stored at the data management server. Moreover, in some implementations, the identity data can also be removed from the data management server such that the data management server does not store personally identifiable information.

At 206, encrypted user profile data (that is anonymized and does not include the identity data) can be received from the personal compute device. For example, a user of the personal compute device can select a relying party from a list of relying parties provided to the user of the personal compute device (e.g., by the data management server). After selecting the relying party (for sending a request), the personal compute device can encrypt the user profile data, received from the data management server and stored at the personal compute device, to generate an encrypted user profile data. The encrypted user profile data can be encrypted using the public key associated with the relying party identified by the user of the personal compute device. As discussed above, the encrypted user profile data can be anonymized such that the relying party is unable to identify an identity of the user based on the encrypted user profile data.

At 207, the encrypted user profile data can be sent to a relying party compute device such that the compute device associated with the relying party (1) decrypts the encrypted user profile data using a private key corresponding to the public key to define decrypted user profile data, (2) generates a hash value of the decrypted user profile data, and (3) compares the hash value of the decrypted user profile data and the hash value of the user profile data in the distributed database to determine integrity of the decrypted user profile data.

FIG. 3 is a flowchart of a method 300 for sending an encrypted user profile to a relying party for verification and response, according to an embodiment. In some implementations, a personal compute device (such as the personal compute device 110 shown and described with respect to FIG. 1) can be used to perform the method 300. At 301, a user profile data of a user of the personal compute device can be received from a set of data repositories (e.g., a health repository, a financial repository, a credit repository, and/or the like) via a data management server (e.g., data management server 130 shown and described with respect to FIG. 1). In addition to the user profile data, in some instances, the personal compute device can receive identity data (e.g., a legal name, a home address, an email address, a mobile phone number, a social security number, biometric data, and/or the like) associated with the user. The identity data can be separated from the user profile data to anonymize the user profile data.

At 302, the user profile data can be stored (e.g., in a memory) at the personal compute device. At 303, a public key associated with a relying party can be retrieved from the data management server as described above with respect to FIG. 1. At 304, the user profile data can be encrypted using the public key to define encrypted user profile data as described above with respect to FIG. 1.

At 305, the encrypted user profile data can be transmitted from the personal compute device to the relying party via the data management server. In response to the encrypted user profile data and/or a request (e.g., a loan request), the relying party (1) decrypts the encrypted user profile data using a private key corresponding to the public key to define decrypted user profile data, (2) generates a hash value of the decrypted user profile data, and (3) compares the hash value of the decrypted user profile data and a hash value of the user profile data stored in a distributed database to determine integrity of the decrypted user profile data. At 306, a response based on the user profile data can be received via the data management server.

In some instances, the method 300 can include transmitting, from the personal compute device and to the data management server, information about a user of the personal compute device (e.g., information entered by the user, information collected by an application stored in the personal compute device, and/or the like) to add to the user profile data. The user profile data, after adding the information about the user received from the personal compute device, can then be sent back to the personal compute device as a portion of the user profile data.

FIG. 4 is a flowchart of a method 400 for receiving an encrypted user profile data and verifying the encrypted user profile data, according to an embodiment. In some implementations, a relying party compute device (such as the relying party compute device 120 shown and described with respect to FIG. 1) can be used to perform the method 400. At 401, a request and encrypted user profile data can be received from a personal compute device and via a data management server. The encrypted user profile data is encrypted using a public key associated with the relying party compute device.

At 402, the encrypted user profile data is decrypted using a private key corresponding to the public key to define decrypted user profile data as described above with respect to FIG. 1. The user profile data can also be anonymized such that the relying party compute device is unable to determine an identify of a user of the personal compute device based on the user profile data. At 403, a first hash value is generated using the decrypted user profile data. At 404, a second hash value is retrieved from a distributed database. The second hash value is associated with an identifier associated with the personal compute device as described above with respect to FIG. 1. At 405, the first hash value and the second hash value are compared to determine integrity of the decrypted user profile data. At 406, the request is evaluated based on the decrypted user profile data. At 407, a response to the request can be sent to the personal compute device via the data management server based on the user profile data.

In some embodiments, when the request and/or the response to the request indicates that the user and/or the relying party (e.g., using the relying party compute device) have decided to work together (e.g., when the user identifies the relying party to send the request and the relaying part generates a positive response to the request) the personal compute device can be configured to send personal information (e.g., identity data) of the user to the relying party compute device. For example, the user of the personal compute device can determine to send a loan request to a loan service officer using the relying party compute device. The loan request includes the anonymized user profile data (without the identity data) which can be used to, for example, determine financial and credibility of the user without identifying the user. Once, the loan service officer, using the relying party compute device, determines to grant a loan in response to the loan request, the relying party compute device can send a signal (e.g., via the data management server) indicating a notification of grant of the loan request, an offer of a loan, and/or a request for personal information of the user. Based on the grant of the loan request, the offer of the loan, and/or the request for personal information, the user can decide to accept the offer and can then send identity information to the relying party compute device such that the loan process can move forward. Accordingly, the user need not provide identity information to the relying party until after approval.

The user profile data generated, retrieved, and/or used by the personal compute device, the data management server, and/or the relying party compute device can highly secure and private. In some instances, the user profile data can be referred to as triple masked data, because, the user profile data is (a) end-to-end encrypted, (b) identity stripped, and (c) distributed database (e.g., blockchain) verified. The personal compute device, the data management server, and/or the relying party compute device can use end-to-end encryption (e.g., using an encryption software service) such that the user profile data cannot be viewed in transit or when stored in the personal compute device, the data management server, and/or the relying party compute device.

The personal compute device, the data management server, and/or the relying party compute device, separately or collectively, can identity strip data such that medical data, financial data, and/or the like are separated from real world identity of a user of the personal compute device. The personal compute device, the data management server, and/or the relying party compute device use distributed database (e.g., blockchain) verification of data such that the user profile is verifiable, and the user has a choice or control whether to share the user profile with a relying party. Therefore, the user of the personal compute device can submit a request(s) to the relying part without revealing identity or leaking unnecessary data. Moreover, the distributed database verification of user profile data can allow the user to trace historical access and storage of the user profile data (e.g., to what device and/or for what purpose the user profile data was shared).

In some instances, for tracing the user profile data, participant devices (personal compute devices, data management servers, relying party compute devices, data repositories, distributed database instances, and/or any other compute device in the data management system) can access ledger/nodes of a distributed database to enable a user to track access and use of the user profile data. For example, each time a relying party accesses a hash of the user profile data on the distributed database, that access is recorded in the distributed database so that the user can trace which device among the relying party devices accessed the data. This allows the user to monitor access of the hash of their data.

In some instances, the distributed database can be operated by various distributed nodes (e.g., compute devices). Such nodes can include relying party compute devices, data management servers, personal compute devices and/or other third-party compute devices. Each node of the distributed nodes can include an instance of the distributed database that stores the contents of the distributed database. A consensus protocol can be used to define consensus between the various nodes operating the distribute database. When accessing the distributed database, a device can send data to and/or request data from a node of the distributed database.

In some instances, the data management system can introduce incentives to promote security and privacy in the data management system. The incentive can be a token that can have, for example, a financial value or a reputation value. The incentive via the token generates a security and privacy incentive for consent and compensation between users of the personal compute devices and users of the relying party compute devices. Therefore, the incentive to promote security and privacy in the data management system can decrease operational costs for a lender and reduce hacking attempts. For example, in some instances, a personal compute device can receive a token for operating as a node of a distributed database for an amount of time (e.g., a month, a year, 2 years, 5 years, 10 years, and/or the like) larger than a predetermined threshold. After receiving the token, the personal compute device can send (via a data management server) a request associated to the token to a relying party to receive a more favorable response from the relying party compared to a request not associated to the token.

The request mentioned above with respect to FIGS. 1-4 can include, for example, a mortgage request, an auto loan request, a utility service request, a business loan request(s), a healthcare diagnosis request, a license request, a passport request, a travel visa request, a purchase request, a background check request, a social security application, a Medicare application, an unemployment benefit application, a voter registration application, a voter authentication request, and/or the like. The response mentioned above can include, for example, a yes or no response to the request, a report(s) generated in response to the request, a report(s) generated in response to the request, a credit estimate(s), a buying power, a diagnosis, and/or the like. As an example, a report can include missed payments, bankruptcy reports, amount of utilized credit, cash in accounts, stocks, bonds, cryptocurrencies, net worth, healthcare information, background information, and/or the like.

In one example, a data management server (e.g., the data management server 130 as shown and described with respect to FIG. 1) receives a request (e.g., a business loan request(s), and/or the like) from a user (a borrower) of a personal compute device (e.g., using the personal compute device 110 of FIG. 1) that identifies a relying party (e.g., a lender). The request of the personal compute device retrieves a public key (e.g., an Ethereum® public key) associated with a relying party compute device (e.g., from the data management server). The personal compute device uses the public key to encrypt user profile data (e.g., including financial data, medical data, tax data, and/or the like) to generate an encrypted user profile and sends the encrypted user profile to the relying party compute device via the data management server. The user profile data can be received from a set of data repositories (e.g., Plaid®, Fincity®, and/or the like).

The relying party compute device verifies integrity of the user profile data by (1) decrypting the encrypted user profile data using a private key corresponding to the public key to define decrypted user profile data, (2) generating a hash value of the decrypted user profile data, and (3) comparing the hash value of the decrypted user profile data and a hash value of the user profile data stored in a distributed database. Once the relying party compute device verifies integrity of the user profile data (i.e., instead of requesting a credit score of the user) that the user provided, the relying party can analyze the request based on the decrypted user profile data and generate a response (e.g., yes/no answer, a report, a score, an amount, and/or the like) for the user. The relying party can then send the response to the user via the data management server (e.g., uploaded to a user account, an email, a message, and/or the like) or directly (e.g., a mail, a text, an email, and/or the like). The time span from sending the request to receiving the response can be, for example, 5 seconds, 10 seconds, 50 seconds, 100 seconds, and/or the like.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A method, comprising:
receiving, at a personal compute device and via a data management server, user profile data of a user of the personal compute device from a plurality of data repositories;
storing, at the personal compute device, the user profile data;
retrieving, from the data management server, a public key associated with a relying party;
encrypting, at the personal compute device and using the public key, the user profile data to define encrypted user profile data;
transmitting the encrypted user profile data from the personal compute device to a compute device associated with the relying party via the data management server such that the compute device associated with the relying party (1) decrypts the encrypted user profile data using a private key corresponding to the public key to define decrypted user profile data, (2) generates a hash value of the decrypted user profile data, and (3) compares the hash value of the decrypted user profile data and a hash value of the user profile data stored in a distributed database to determine integrity of the decrypted user profile data; and
receiving, from the compute device associated with the relying party and via the data management server, a response based on the user profile data.
2. The method of claim 1, wherein the user profile data of the user is anonymized user profile data.
3. The method of claim 1, wherein the distributed database is a blockchain.

4. The method of claim 1, wherein the hash value of the user profile data is stored in the distributed databased in association with a public key of the personal compute device.

5. The method of claim 1, wherein the user profile data includes at least one of financial data or health data.

6. The method of claim 1, wherein the personal compute device is a first personal compute device of the user, the method further comprising:
   establishing, at the first personal compute device of the user, a connection between the first personal compute device and a second personal compute device, and
   authorizing, at the first personal compute device, the second personal compute device to send, via the data management server, a request to the compute device associated with the relying party identified by the user.

7. The method of claim 1, further comprising:
   tracing, at the personal compute device, historical access and storage of the user profile data.

8. A non-transitory processor-readable medium storing code representing instructions to be executed by a processor, the code comprising code to cause the processor to:
   receive, at a data management server and from a plurality of data repositories, user profile data of a user of a personal compute device;
   generate, at the data management server, a hash value of the user profile data;
   store the hash value of the user profile data in a distributed database;
   send the user profile data to the personal compute device;
   remove, after the generating and sending, the user profile data from the data management server;
   receive encrypted user profile data from the personal compute device, the encrypted user profile data encrypted using a public key associated with a relying party identified by the user of the personal compute device; and
   send the encrypted user profile data to a compute device associated with the relying party such that the compute device associated with the relying party (1) decrypts the encrypted user profile data using a private key corresponding to the public key to define decrypted user profile data, (2) generates a hash value of the decrypted user profile data, and (3) compares the hash value of the decrypted user profile data and the hash value of the user profile data in the distributed database to determine integrity of the decrypted user profile data.

9. The non-transitory processor-readable medium of claim 8, wherein the user profile data of the user is anonymized user profile data.

10. The non-transitory processor-readable medium of claim 8, wherein the distributed database is a blockchain.

11. The non-transitory processor-readable medium of claim 8, wherein the hash value of the user profile data is stored in the distributed databased in association with a public key associated with the personal compute device.

12. The non-transitory processor-readable medium of claim 8, wherein the user profile data includes at least one of financial data or health data.

13. The non-transitory processor-readable medium of claim 8, further comprising code to cause the processor to:
   receive, at the data management server and with the user profile data, identity data associated with the user;
   separate the identity data from the user profile data to anonymize the user profile data before generating the hash value of the user profile data such that the hash value of the user profile data is based on anonymized user profile data.

\* \* \* \* \*